United States Patent [19]

Newland

[11] 4,033,126
[45] July 5, 1977

[54] SOLAR ENERGY DEVICE

[76] Inventor: Elwood L. Newland, 2434 Clayward St., Flint, Mich. 48506

[22] Filed: Apr. 9, 1975

[21] Appl. No.: 566,213

[52] U.S. Cl. .................................. 60/398; 60/641
[51] Int. Cl.² ........................................ F03G 7/02
[58] Field of Search ............ 60/641; 126/270, 271; 60/398, 650, 682

[56] References Cited

UNITED STATES PATENTS

| 965,391 | 7/1910 | Little | 126/270 |
|---|---|---|---|
| 3,436,908 | 4/1969 | Delic | 60/641 |
| 3,875,925 | 8/1975 | Johnston | 126/270 |
| 3,894,393 | 7/1975 | Carlson | 60/641 |
| 3,901,036 | 8/1975 | Martin | 126/270 X |

Primary Examiner—Allen M. Ostrager
Attorney, Agent, or Firm—Gifford, Chandler, Sheridan & Sprinkle

[57] ABSTRACT

A solar energy powered hot air turbine comprising a heat collector having an air inlet and outlet with the turbine connected to the air inlet. The heat collector is heated by solar energy and is constructed so that the hot air exhausts through the air outlet thus sucking air in through the air inlet to power the turbine.

7 Claims, 2 Drawing Figures

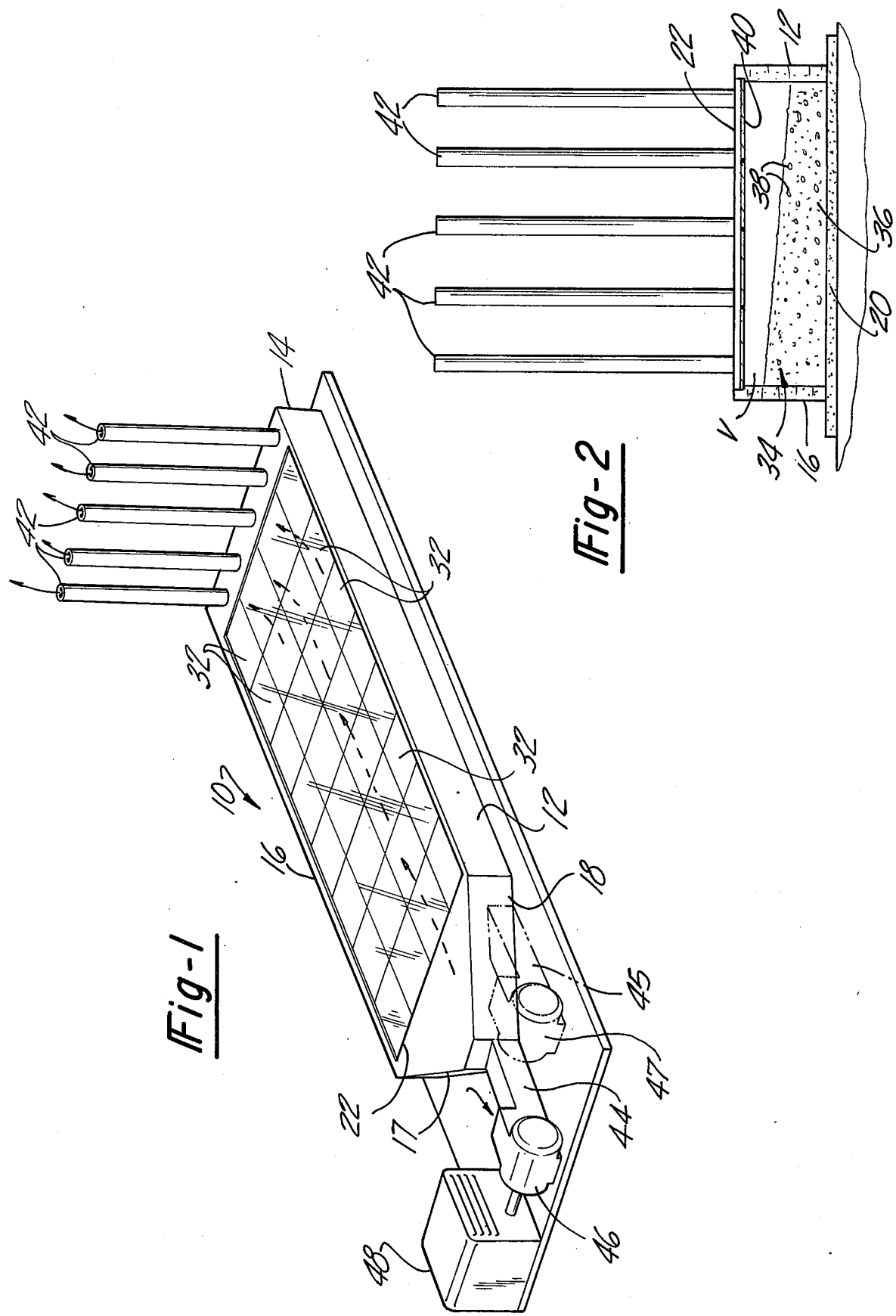

SOLAR ENERGY DEVICE

BACKGROUND OF THE INVENTION

I. Field of the Invention

The present invention relates generally to solar devices and, more particularly, to a solar energy powered, hot air turbine.

II. Description of the Prior Art

Due primarily to the high cost and possible exhaustion of the world's fossil fuel supply, designers have only recently turned their attention towards devices adapted to harness solar energy. The advantages of solar devices are primarily twofold. First, the life expectancy of the sun, the source of solar energy is approximately 3½ billion years and, secondly, solar energy is cost-free.

The proper method or apparatus for most efficiently harnessing solar energy, however, has been a subject of great debate. One previously known device for directly converting solar energy into electricity has been the photocell. The photocell, however, suffers two major disadvantages. First, the electrical energy output per area of photocell is very low so that a large number of the relatively expensive photocells must be utilized in order to generate a usable quantum of electricity. Secondly, photocells are only capable of temporarily storing energy and thus generate electricity only in periods of sunshine.

Another previously known device for converting solar energy into electrical energy utilizes the solar energy to heat a liquid which is typically water. The heated liquid can be used directly for heating or it can be used to power a turbine which in turn rotates a generator to produce electricity. The disadvantage of solar-heated liquid turbine systems is that such systems are unduly expensive to construct. Furthermore water turbine systems are closed systems which present a disadvantage which will later be more clearly understood as contrasted against the present invention.

SUMMARY OF THE PRESENT INVENTION

The apparatus of the present invention solves the above mentioned disadvantages of the previously known solar powered systems by providing a solar powered hot air turbine system. In brief, a heat collector having an air inlet and outlet forms the heart of the present invention. The heat collector basically comprises a sealed enclosure having a transparent ceiling and a heat absorbent base. Thus, in operation, solar energy passes through the transparent ceiling and heats the air contained within the enclosure. The heat absorbent base likewise becomes heated and serves to enhance the heating of the air within the enclosure.

The heated air expands and rises out through the enclosure outlet while simultaneously drawing or sucking air into the enclosure via the air inlet. Hence by attaching an air turbine to the air inlet, the turbine is powered by air passing through the air inlet. A generator is attached to the turbine in the conventional manner from generating electricity.

BRIEF DESCRIPTION OF THE DRAWING

The solar powered air turbine of the present invention will be more clearly understood by reference to the following detailed description when read in conjunction with accompanying drawing wherein like reference characters refer to like parts throughout the several views and in which:

FIG. 1 is a perspective view of the solar powered hot air turbine of the present invention; and FIG. 2 is a cross sectional view taken substantially along line 2—2 of FIG. 1.

DETAILED DESCRIPTION

The solar powered hot air turbine system of the present invention primarily comprises a heat collector 10 in combination with a turbine 46. The turbine 46 is coupled to a generator 48. The heat collector 10 is a sealed enclosure having side walls 12, 14, 16, 17 and 18, a base 20, and a ceiling 22 thus defining a volume V. The heat collector 10 is preferably disposed on ground which rises slightly from left to right in FIG. 1 to enhance movement of the air in a manner which will become apparent as the description proceeds.

The ceiling 22 is transparent and preferably constructed of glass panels 32 so that the sun rays can freely pass through the glass panels 32 and heat the air within the volume V. To further enhance the heating of the air within the volume V, the base 20 is preferably covered with a heat absorbent material 34. This material could be any dark or black material such as asphalt 36 or asphalt 36 and heavy rocks 38. If rocks 38 are used preferably the base would be a mixture of from 10–40% rock with the remainder asphalt 36. The heat absorbent material 34 is heated by the sunlight passing through the ceiling 22 and transfers this heat by conduction and convection to the air within the volume V. The heat absorbent material 34 thus not only functions to more efficiently transfer solar heat to the air within the volume V but also functions as a heat storage device, i.e. if sunlight is temporarily obscured from the ceiling 22 by a cloud or the like, the heat absorbent material continues to heat the air in chamber V.

An outlet 40 is formed along a portion of the ceiling 22 adjacent the sidewall 14. A number of exhaust stacks 42 are operatively connected to the outlet 40 and function to exhaust hot air from the chamber V.

A conduit 44 connected to the sidewalls 17–18 forms the inlet to the chamber V. The turbine 46 is attached to the inlet conduit so that all air which passes through the inlet conduit 44 likewise passes through and rotates the turbine 46. The generator 48 is conventionally attached to the turbine for generating electric power.

The full operation of the present invention may now be described. As the sunlight passes through the ceiling 22, the solar energy heats the air within the chamber V, both directly and indirectly through the heat absorbent material 34. The heated air both rises and expands and is consequently exhausted out the exhaust stacks 42.

As hot air is exhausted out through the exhaust stacks 42, relatively cool air is correspondingly sucked into the chamber V and through the turbine 46 at a relatively high rate of speed. The turbine 46, of course, rotates the generator 48 to produce electricity.

While it has been preferred to describe a system utilizing a single turbine 46, it should be apparent that the system could be used as well with more than one turbine. Additional turbines could be positioned in the same inlet conduit 44 or additional inlets (shown in phantom at 45) could be provided with one or more turbines (shown in phantom line at 47) positioned in each inlet. Generators (not shown) would be coupled to each turbine.

The apparatus of the present invention thus eliminates the complexity and expense of the solar heated liquid systems. Moreover, the solar heating system of the present invention is an open loop system rather than closed loop as are previously known liquid systems. Thus with the present invention the hot air is simply exhausted into the atmosphere rather than recirculated. This aspect of the present invention creates an additional advantage of the present invention over the previously known liquid systems, namely that air blowing over the exhaust stacks 24 creats a venturi effect in the exhaust stacks. This venturi effect acts to draw air out of the exhaust stacks and thereby enhances the air circulation through the heat collector 10. Thus even on days when there is little sunshine there will be air flow and thus turbine operation. This arrangement in combinatin with the use of heat absorbent and retention material will also provide operation of the turbines throughout much or all of the nighttime hours.

Having thus described my invention, many modifications of the present invention will become apparent to those skilled in the art to which it pertains without deviating from the spirit of the invention as defined by the scope of the appended claims.

What is claimed is:

1. Apparatus for the utilization of solar energy comprising a heat collector having an air inlet and an air outlet, an air powdered turbine coupled to the inlet so that the air passing into said inlet also passes through said turbine and at least one vertically extending exhaust stack attached to said outlet.

2. The apparatus as defined in claim 1 and including a generator coupled to said turbine.

3. The invention as defined in claim 1 wherein said heat collector further comprises a sealed enclosure having a transparent ceiling and a heat absorbent base.

4. The invention as defined in claim 1 and including a second turbine coupled to said inlet so that air passing into said inlet also passes through each of said turbines.

5. The invention as defined in claim 1 and including a plurality of air inlets and at least one air powered turbine is disposed in each of said inlets.

6. The invention as defined in claim 3 wherein said ceiling is constructed of glass and said base is constructed of asphalt.

7. The invention as defined in claim 3 wherein said ceiling is constructed of glass and said base is constructed of a mixture of 10–40% heavy rock and the remainder asphalt.

* * * * *